United States Patent
Tsunezawa et al.

(10) Patent No.: US 10,501,830 B2
(45) Date of Patent: *Dec. 10, 2019

(54) HIGH-STRENGTH COLD-ROLLED STEEL SHEET, HIGH-STRENGTH HOT-DIP GALVANIZED STEEL SHEET, AND HIGH-STRENGTH HOT-DIP GALVANNEALED STEEL SHEET HAVING EXCELLENT DUCTILITY, STRETCH-FLANGEABILITY, AND WELDABILITY

(71) Applicant: Kabushiki Kaisha Kobe Seiko Sho (Kobe Steel, Ltd.), Kobe-shi (JP)

(72) Inventors: Michitaka Tsunezawa, Kakogawa (JP); Michiharu Nakaya, Kakogawa (JP)

(73) Assignee: Kabushiki Kaisha Kobe Seiko Sho (Kobe Steel, Ltd.), Kobe-shi (JP)

( * ) Notice: Subject to any disclaimer, the term of this patent is extended or adjusted under 35 U.S.C. 154(b) by 106 days.

This patent is subject to a terminal disclaimer.

(21) Appl. No.: 15/128,410

(22) PCT Filed: Mar. 19, 2015

(86) PCT No.: PCT/JP2015/058194
§ 371 (c)(1),
(2) Date: Sep. 22, 2016

(87) PCT Pub. No.: WO2015/151827
PCT Pub. Date: Oct. 8, 2015

(65) Prior Publication Data
US 2018/0171442 A1  Jun. 21, 2018

(30) Foreign Application Priority Data

Mar. 31, 2014 (JP) ................................. 2014-073441
Jan. 29, 2015 (JP) ................................. 2015-015866

(51) Int. Cl.
*B32B 15/00* (2006.01)
*C22C 38/14* (2006.01)
(Continued)

(52) U.S. Cl.
CPC ............ *C22C 38/14* (2013.01); *B32B 15/013* (2013.01); *C21D 8/0273* (2013.01);
(Continued)

(58) Field of Classification Search
None
See application file for complete search history.

(56) References Cited

U.S. PATENT DOCUMENTS

2008/0000555 A1\* 1/2008 Nonaka .................... B21B 3/02
148/328
2009/0277547 A1\* 11/2009 Saito ........................ C21D 1/25
148/661

(Continued)

FOREIGN PATENT DOCUMENTS

JP  2003-253385 A  9/2003
JP  2003253385  \*  9/2003  ............. C22C 38/00
(Continued)

OTHER PUBLICATIONS

English translation of the International Preliminary Report on Patentability and Written Opinion dated Oct. 4, 2016 in PCT/JP2015/058194.
(Continued)

*Primary Examiner* — Seth Dumbris
(74) *Attorney, Agent, or Firm* — Oblon, McClelland, Maier & Neustadt, L.L.P.

(57) ABSTRACT

Provided is a high-strength cold-rolled steel sheet having excellent ductility and stretch-flangeability as well as weldability in a range in which a tensile strength is 980 MPa or higher and a 0.2% yield strength is 700 MPa or higher. In the
(Continued)

high-strength cold-rolled steel sheet of the present invention, the chemical composition is adjusted as appropriate, and the area ratio of below-mentioned metal structures at a position of ¼ sheet thickness in the steel sheet satisfies following requirements: tempered martensite: 30 area % or more, bainite: 15 area % to 70 area %, total of tempered martensite and bainite: 90 area % or more, ferrite: 0 area % to 5 area %, and retained austenite: 0 area % to 4 area %. The high-strength cold-rolled steel sheet has excellent ductility, stretch-flangeability, and weldability, and has a tensile strength of 980 MPa or higher and a 0.2% yield strength of 700 MPa or higher.

6 Claims, 2 Drawing Sheets

(51) Int. Cl.

| | |
|---|---|
| C21D 8/02 | (2006.01) |
| C22C 38/00 | (2006.01) |
| C22C 38/02 | (2006.01) |
| C22C 38/04 | (2006.01) |
| C22C 38/06 | (2006.01) |
| C23C 2/02 | (2006.01) |
| C23C 2/06 | (2006.01) |
| C23C 2/40 | (2006.01) |
| C23C 2/28 | (2006.01) |
| B32B 15/01 | (2006.01) |
| C22C 38/08 | (2006.01) |
| C22C 38/12 | (2006.01) |
| C22C 38/16 | (2006.01) |
| C22C 38/26 | (2006.01) |
| C22C 38/28 | (2006.01) |
| C22C 38/32 | (2006.01) |
| C22C 38/38 | (2006.01) |
| C21D 9/46 | (2006.01) |

(52) U.S. Cl.
CPC ............ *C21D 8/0278* (2013.01); *C22C 38/00* (2013.01); *C22C 38/002* (2013.01); *C22C 38/02* (2013.01); *C22C 38/04* (2013.01); *C22C 38/06* (2013.01); *C22C 38/08* (2013.01); *C22C 38/12* (2013.01); *C22C 38/16* (2013.01); *C22C 38/26* (2013.01); *C22C 38/28* (2013.01); *C22C 38/32* (2013.01); *C22C 38/38* (2013.01); *C23C 2/02* (2013.01); *C23C 2/06* (2013.01); *C23C 2/28* (2013.01); *C23C 2/40* (2013.01); *C21D 8/0236* (2013.01); *C21D 9/46* (2013.01); *C21D 2211/002* (2013.01); *C21D 2211/005* (2013.01); *C21D 2211/008* (2013.01); *Y10T 428/12799* (2015.01)

(56) References Cited

U.S. PATENT DOCUMENTS

| | | | |
|---|---|---|---|
| 2011/0030854 A1* | 2/2011 | Matsuda | C21D 1/25 |
| | | | 148/504 |
| 2012/0325376 A1 | 12/2012 | Makimizu et al. | |
| 2013/0087253 A1* | 4/2013 | Matsuda | C21D 9/46 |
| | | | 148/533 |
| 2013/0206288 A1 | 8/2013 | Kaneko et al. | |
| 2014/0227555 A1 | 8/2014 | Kawata et al. | |
| 2014/0234660 A1* | 8/2014 | Kawata | B21B 3/00 |
| | | | 428/659 |
| 2014/0377584 A1 | 12/2014 | Hasegawa et al. | |
| 2015/0083278 A1 | 3/2015 | Kawata et al. | |
| 2016/0160310 A1 | 6/2016 | Hasegawa et al. | |
| 2016/0177414 A1* | 6/2016 | Takashima | C21D 9/46 |
| | | | 148/652 |
| 2016/0273066 A1* | 9/2016 | Sakakibara | C21D 8/0226 |

FOREIGN PATENT DOCUMENTS

| | | |
|---|---|---|
| JP | 2008-297592 A | 12/2008 |
| JP | 2011-32549 A | 2/2011 |
| JP | 2011-111671 A | 6/2011 |
| JP | 2011-132576 A | 7/2011 |
| JP | 2011-225915 A | 11/2011 |
| JP | 2012-31462 A | 2/2012 |
| JP | 2013-227657 A | 11/2013 |

OTHER PUBLICATIONS

International Search Report dated May 12, 2015, in PCT/JP15/058194 filed Mar. 19, 2015.

\* cited by examiner

HIGH-STRENGTH COLD-ROLLED STEEL SHEET, HIGH-STRENGTH HOT-DIP GALVANIZED STEEL SHEET, AND HIGH-STRENGTH HOT-DIP GALVANNEALED STEEL SHEET HAVING EXCELLENT DUCTILITY, STRETCH-FLANGEABILITY, AND WELDABILITY

TECHNICAL FIELD

The present invention relates to a high-strength cold-rolled steel sheet, a high-strength hot-dip galvanized steel sheet, and a high-strength hot-dip galvannealed steel sheet having excellent ductility, stretch-flangeability, and weldability and a tensile strength of 980 MPa or higher and a 0.2% yield strength of 700 MPa or higher. These steel sheets can be together referred to hereinbelow simply as a high-strength steel sheet.

BACKGROUND ART

As the strength of components such as steel sheets for automobiles or transport equipment has been growing, the processability such as ductility and stretch-flangeability has decreased making it difficult to form parts of complex shape by pressing. Accordingly, techniques ensuring excellent processability even for high-strength steel sheets need to be provided. Further, for example, steel sheets for automobiles are also required to excel in weldability because the parts are mainly assembled by spot welding. A cross tensile strength (CTS) (measured by the cross tension test) obtained by spot welding together the sheets of the same steel and performing a cross tension test in the peeling direction is generally used as quality parameter of welded portions of high-strength steel sheets.

The following patent documents suggest techniques for improving the processability, among the required characteristics, of high-strength steel sheets.

In Patent Literature 1, in particular, B is contained, the ratio of amounts of Ti and N is adjusted, as appropriate, and a steel structure is made to include mainly the tempered martensite, with the retained austenite or additionally ferrite and martensite having the desired area ratio. As a result, both the strength and the moldability (elongation and stretch-flangeability) of the steel sheet can be improved. Among the structural components, it is indicated that by including the retained austenite at 5 area % or more, the total elongation (EL) is ensured. However, Patent Literature 1 is restricted to investigating strengthening and moldability, and weldability is not considered.

In Patent Literature 2, the strength of the martensite structure is increased without increasing the volume ratio of martensite, and the decrease in ferrite volume which ensures ductility is reduced to a minimum, and the volume ratio of ferrite is controlled to 50% or more. As a result, a high-strength cold-rolled steel sheet and a high-strength galvanized steel sheet are obtained in which ductility and delayed fracture resistance can be ensured and also a maximum tensile strength of 900 MPa or higher can be ensured. However, similarly to Patent Literature 1, weldability is not investigated.

CITATION LIST

Patent Literature

Patent Literature 1: Japanese Unexamined Patent Publication No. 2012-31462

Patent Literature 2: Japanese Unexamined Patent Publication No. 2011-111671

SUMMARY OF INVENTION

As mentioned hereinabove, in Patent Literature 1 and 2, the tensile strength, ductility, and stretch-flangeability are investigated, but weldability is not investigated.

The present invention has been created with the foregoing in view, and it is an objective thereof to provide a high-strength steel sheet that excels in ductility, stretch-flangeability, and weldability in a high-strength range with a tensile strength of 980 MPa or higher and a 0.2% yield strength of 700 MPa or higher.

The high-strength cold-rolled steel sheet with a tensile strength of 980 MPa or higher and a 0.2% yield strength of 700 MPa or higher in accordance with the present invention which makes it possible to attain the objective contains: in percent by mass, C: 0.07% to 0.15%, Si: 1.1% to 1.6%, Mn: 2.0% to 2.8%, P: more than 0% to 0.015%, S: more than 0% to 0.005%, Al: 0.015% to 0.06%, Ti: 0.010% to 0.03%, and B: 0.0010% to 0.004%, with the balance being iron and inevitable impurities, wherein an area ratio of following metal structures at a position of ¼ sheet thickness in the steel sheet satisfies following requirements: tempered martensite: 30 area % or more, bainite: 15 area % to 70 area %, total of tempered martensite and bainite: 90 area % or more, ferrite: 0 area % to 5 area %, and retained austenite: 0 area % to 4 area %.

In the preferred embodiment of the present invention, the high-strength cold-rolled steel sheet may further contain: one or more selected from the group consisting of: Cu: more than 0% to 0.3%, Ni: more than 0% to 0.3%, Cr: more than 0% to 0.3%, Mo: more than 0% to 0.3%, V: more than 0% to 0.3%, and Nb: more than 0% to 0.03%.

In the preferred embodiment of the present invention, the high-strength cold-rolled steel sheet may further contain Ca: more than 0% to 0.005%.

In the preferred embodiment of the present invention, in the high-strength cold-rolled steel sheet, an area ratio of following metal structures in a surface layer region at 20 μm in a sheet thickness direction from an outermost surface layer portion of the steel sheet satisfies following requirements: ferrite: 80 area % or more, and a total area ratio of martensite and bainite: 0 area % to 20 area %.

The present invention is also inclusive of a high-strength hot-dip galvanized steel sheet having a galvanized layer on the surface of the high-strength cold-rolled steel sheet, and a high-strength hot-dip galvannealed steel sheet having a galvannealed layer on the surface of the high-strength cold-rolled steel sheet.

In accordance with the present invention, since the steel components and structure are controlled as appropriate, it is possible to provide a high-strength cold-rolled steel sheet, hot-dip galvanized steel sheet, and hot-dip galvannealed steel sheet having excellent ductility, stretch-flangeability, and weldability and a tensile strength of 980 MPa or higher and a 0.2% yield strength of 700 MPa or higher.

DESCRIPTION OF EMBODIMENTS

The inventors have conducted a comprehensive study focused on steel components and metal structures in order to provide a high-strength steel sheet such that even when the tensile strength is 980 MPa or higher and the 0.2% yield strength is 700 MPa or higher, excellent ductility and stretch-flangeability (can be also referred to hereinbelow as "processability") are obtained and weldability is improved. The results have demonstrated that weldability can be effectively ensured by controlling, as appropriate, the amount of C as a steel component to a low value. It has also been found that even with such a small amount of C, excellent processability can be ensured when an area ratio of the following metal structures in a region of ¼ sheet thickness t in the steel sheet from the outermost surface layer portion (can be also referred to hereinbelow as "t/4 portion") is controlled to tempered martensite: 30 area % or more, bainite: 15 area % to 70 area %, total of tempered martensite and bainite: 90 area % or more, ferrite: 0 area % to 5 area %, and retained austenite: 0 area % to 4 area %.

The inventors have also found that in order to ensure good bending processability, it is preferred that the area ratio of the following metal structures in a surface layer region at 20 μm in the sheet thickness direction from the outermost surface layer portion of the steel sheet be controlled to ferrite: 80 area % or more, and a total area ratio of martensite and bainite: 0 area % to 20 area %. Those findings led to the creation of the present invention.

As for the martensite, the present invention specifies the ratio of tempered martensite in the t/4 portion of the steel sheet and the ratio of martensite including tempered martensite in the surface layer portion. This is because the as-quenched martensite remains in the surface layer portion and, therefore, needs to be included in the specified amount, whereas in the t/4 portion, the as-quenched martensite is entirely tempered and converted into tempered martensite. Therefore, the as-quenched martensite needs not to be taken into account.

In the present specification, a high strength means a tensile strength of 980 MPa or higher and a 0.2% yield strength of 700 MPa or higher. The upper limit of the tensile strength is not particularly limited, provided that the requirements of the present invention are fulfilled. For example, a tensile strength of about 1370 MPa and a 0.2% yield strength of about 980 MPa are also included in the high strength in the present specification.

First, metal structures which are most important in terms of characterizing the present invention will be described in detail. The area ratio of each metal structure is measured by a point algorithm with respect to ferrite, bainite, and martensite, and by an X-ray diffraction method with respect to retained austenite. In addition to the point algorithm, the presence of ferrite was also confirmed by IQ (Image Quality) based on the EBSD (Electron Back Scatter Diffraction) pattern sharpness. These measurement methods are explained hereinbelow in greater detail in the section relating to examples.

(1) Metal Structures at a Position of ¼ Sheet Thickness in the Steel Sheet

Where the thickness of the steel sheet in accordance with the present invention is taken as t, metal structures in a region at ¼ from the outermost surface layer portion are important to ensure the desired strength (tensile strength and 0.2% yield strength) and processability (ductility and stretch-flangeability).

[Tempered Martensite: 30 Area % or More]

Tempered martensite is a structure important to ensure strength. Where tempered martensite takes less than 30 area %, the tensile strength or 0.2% yield strength decreases. To ensure the effect of tempered martensite, the lower limit of the area ratio of tempered martensite is set to 30 area % or more, preferably 33 area % or more, more preferably 35 area % or more. However, where the area ratio of tempered martensite is too large, the area ratio of bainite becomes relatively small and ductility and stretch-flangeability can decrease. For this reason, the upper limit of the area ratio of tempered martensite is preferably 85 area % or less, more preferably 75 area % or less.

[Bainite: 15 Area % to 70 Area %]

Bainite is a structure which is superior to tempered martensite in ductility and contributes to the increase in ductility and also stretch-flangeability. Where the area ratio of bainite is less than 15 area %, the ductility decreases. Therefore, the lower limit for the area ratio of bainite is set to 15 area % or more, preferably 20 area % or more, more preferably 25 area % or more. However, where the area ratio of bainite becomes too large, the area ratio of tempered martensite becomes relatively small, and the tensile strength or 0.2% yield strength decreases. Therefore, the upper limit of the area ratio of bainite is set to 70 area % or less, preferably 67 area % or less, more preferably 65 area % or less.

[Total of Tempered Martensite and Bainite: 90 Area % or More]

Where the total of tempered martensite and bainite is less than 90 area %, the tensile strength, 0.2% yield strength, and stretch-flangeability decrease. Therefore, the lower limit for the total area ratio of tempered martensite and bainite is set to 90 area % or more, preferably 95 area % or more, more preferably 99 area % or more, most preferably 100 area %.

[Ferrite: 0 Area % to 5 Area %]

Ferrite is a structure that reduces the stretch-flangeability. More specifically, where the area ratio of ferrite increases, fluctuations of difference in hardness between the microstructures increases, microcracks appear during punching, and stretch-flangeability decreases. For this reason, the upper limit of the area ratio of ferrite is set to 5 area % or less, preferably 3 area % or less, more preferably 1 area % or less, most preferably 0 area %.

[Retained Austenite: 0 Area % to 4 Area %]

Retained austenite is a structure that reduces the stretch-flangeability. More specifically, when a steel sheet is punched in a hole expansion test, the retained austenite is transformed into a hard martensite. As a result, the difference in hardness between the structures increases, microcracks easily occur, and stretch-flangeability decreases. Further, where the area ratio of retained austenite increases, the tensile strength and 0.2% yield strength also decrease. For this reason, the upper limit of the area ratio of retained austenite is set to 4 area % or less, preferably 2 area % or less, more preferably 1 area % or less, most preferably 0 area %.

The metal structures in the t/4 portion of the steel sheet are described above, and the steel sheet in accordance with the present invention may be configured only of these metal structures. However, remaining structures which could be inevitably included due to the production process may be contained, for example, within a range of 3 area % or less. Pearlite is an example of such remaining structure.

(2) Metal Structures in a Surface Layer Region at 20 μm in the Sheet Thickness Direction from the Outermost Surface Layer Portion of the Steel Sheet Metal structures inside the steel sheet in a surface layer region at 20 μm in the sheet thickness direction from the outermost surface layer portion of the steel sheet (can be referred to hereinbelow simply as "surface layer portion") are important for improving the properties and also bending processability.

[Ferrite: Preferably 80 Area % or More]

By increasing the area ratio of ferrite, which is high in ductility, in the structure of the surface layer portion which is the maximum tensile strain generation portion in the surface layer during bending deformation, it is possible to suppress local elongation, that is, necking, in the surface layer portion and improve bending processability. For this effect to be advantageously demonstrated, the lower limit for the area ratio of ferrite is preferably 80 area % or more, more preferably 85 area % or more, even more preferably 90 area % or more, and most preferably 100 area %.

[Total Area Ratio of Martensite and Bainite: Preferably 0 Area % to 20 Area %]

Where the total area ratio of martensite and bainite increases, the area ratio of ferrite decreases and bending processability decreases. For this reason, the upper limit of the total area ratio is set preferably to 20 area % or less, more preferably 15 area % or less, even more preferably 10 area % or less, and most preferably 0 area %.

The metal structures in the surface layer portion of the steel sheet are described above, and the steel sheet in accordance with the present invention may be configured only of these metal structures. However, remaining structures which could be inevitably included due to the production process may be contained, for example, within a range of 3 area % or less. Pearlite is an example of such remaining structure.

In accordance with the present invention, in addition to controlling the metal structures in the above manner, chemical components in the steel sheet also need to be controlled as described hereinbelow.

[C: 0.07% to 0.15%]

C is an element required to ensure the strength of the steel sheet. Where the amount of C is insufficient, the tensile strength and 0.2% yield strength decrease. For this reason, the lower limit of the amount of C is set to 0.07% or more. The lower limit of the amount of C is preferably 0.08% or more. However, where the amount of C is too high, the cross tensile strength (CTS), which is an indicator of weldability, decreases. For this reason, the upper limit of the amount of C is set to 0.15% or less. The upper limit of the amount of C is preferably 0.13% or less.

[Si: 1.1% to 1.6%]

Si is known as a solid solution strengthening element and acts effectively to increase the tensile strength, while suppressing the decrease in ductility. Further, silicon is an element increasing the bending processability. For the effect thereof to be advantageously demonstrated, the lower limit of the amount of Si is set to 1.1% or higher. The lower limit of the amount of Si is preferably 1.2% or higher. However, where the amount of silicon added is too high, the effects thereof are saturated and the addition becomes meaningless. For this reason, the upper limit the amount of Si is set to 1.6% or less. The upper limit the amount of Si is preferably 1.55% or less.

[Mn: 2.0% to 2.8%]

Mn is an element that improves hardenability and contributes to strengthening of steel sheets. For these effects to be advantageously demonstrated, the lower limit of the amount of Mn is set to 2.0% or higher. The lower limit of the amount of Mn is preferably 2.1% or higher. However, where the amount of Mn is too high, the processability can be degraded. Meanwhile, by reducing the amount of Mn, it is possible to improve stretch-flangeability (k). For this reason, the upper limit of the amount of Mn is set to 2.8% or less. The upper limit of the amount of Mn is preferably 2.6% or less.

[P: More than 0% to 0.015%]

P is an element contained inevitably. Phosphorus segregates at grain boundaries, promotes intergranular embrittlement, and degrades hole expandability. Therefore, it is recommended that the amount of P be reduced as much as possible. For this reason, the upper limit of the amount of P is set to 0.015% or less. The upper limit of the amount of P is preferably 0.013% or less. P is an impurity inevitably contained in steels and reducing the amount thereof to 0% is impossible in industrial production.

[S: More than 0% to 0.005%]

Similarly to P, S is also an element contained inevitably. Since sulfur generates inclusions and degrades processability, it is recommended that the amount of S be reduced as much as possible. For this reason, the upper limit of the amount of S is set to 0.005% or less. The upper limit of the amount of S is preferably 0.003% or less, more preferably to 0.002% or less. S is an impurity inevitably contained in steels and reducing the amount thereof to 0% is impossible in industrial production.

[Al: 0.015% to 0.06%]

Al is an element acting as a deoxidizing agent. For the effect thereof to be advantageously demonstrated, the lower limit of the amount of Al is set to 0.015% or more. The lower limit of the amount of Al is preferably 0.025% or more. However, where the amount of Al is too high, a large amount in inclusions such as alumina is generated in the steel sheet and the processability can be degraded. For this reason, the upper limit of the amount of Al is set to 0.06% or less. The upper limit of the amount of Al is preferably 0.050% or less.

[Ti: 0.010% to 0.03%]

Ti is an element that forms carbides and nitrides and increases the strength. Further, titanium is an element for effectively activating B-induced hardenability. More specifically, the formation of Ti nitrides decreases the amount of N in steel and suppresses the formation of B nitride, thereby allowing B to be present in a solid solution state and effectively improve hardenability. Thus, by increasing the hardenability, Ti contributes to the strengthening of the steel sheet. For this effect to be advantageously demonstrated, the lower limit of the amount of Ti is set to 0.010% or more. The lower limit of the amount of Ti is preferably 0.015% or more. However, where the amount of Ti is too high, the amount of Ti carbides or Ti nitrides becomes too high and the ductility, stretch-flangeability, and bending processability are degraded. For this reason, the upper limit for the amount of Ti is set to 0.03% or less. The upper limit for the amount of Ti is preferably 0.025% or less.

[B: 0.0010% to 0.004%]

B is an element that increases hardenability and contributes to the strengthening of the steel sheet. For these effects to be advantageously demonstrated, the lower limit of the amount of B is set to 0.0010% or more. The lower limit of the amount of B is preferably 0.0020% or more. However, where the amount of B is too high, the effect thereof is saturated and the cost rises. For this reason, the upper limit for the amount of B is set to 0.004% or less. The upper limit for the amount of B is preferably 0.0035% or less.

The steel sheet in accordance with the present invention has the above component composition, with the balance being iron and inevitable impurities.

In accordance with the present invention, the following optional components may be also contained.

[One or More Selected from the Group Consisting of Cu: More than 0% to 0.3%, Ni: More than 0% to 0.3%, Cr: More than 0% to 0.3%, Mo: More than 0% to 0.3%, V: More than 0% to 0.3%, and Nb: More than 0% to 0.03%]

Cu, Ni, Cr, Mo, V, and Nb are each an element effectively increasing the strength. Those elements may be contained individually or in appropriate combinations thereof.

[Cu: More than 0% to 0.3%]

Cu is an element which is effective in increasing corrosion resistance of steel sheets and may be added as necessary. For the effect thereof to be advantageously demonstrated, the lower limit of the amount of Cu is set preferably to 0.03% or more, more preferably 0.05% or more. However, where the amount of Cu is too high, the effect thereof is saturated and cost rises. For this reason, the upper limit for the amount of Cu is 0.3% or less, more preferably 0.2% or less.

[Ni: More than 0% to 0.3%]

Ni is an element which is effective in increasing corrosion resistance of steel sheets and may be added as necessary. For the effect thereof to be advantageously demonstrated, the lower limit of the amount of Ni is set preferably to 0.03% or more, more preferably 0.05% or more. However, where the amount of Ni is too high, the effect thereof is saturated and cost rises. For this reason, the upper limit for the amount of Ni is 0.3% or less, more preferably 0.2% or less.

[Cr: More than 0% to 0.3%]

Cr is an element which suppresses the formation of ferrite during cooling from a high-temperature region and may be added as necessary. For the effect thereof to be advantageously demonstrated, the lower limit of the amount of Cr is set preferably to 0.03% or more, more preferably 0.05% or more. However, where the amount of Cr is too high, the effect thereof is saturated and cost rises. For this reason, the upper limit for the amount of Cr is 0.3% or less, more preferably 0.2% or less.

[Mo: More than 0% to 0.3%]

Mo is an element which suppresses the formation of ferrite during cooling from a high-temperature region and may be added as necessary. For the effect thereof to be advantageously demonstrated, the lower limit of the amount of Mo is set preferably to 0.03% or more, more preferably 0.05% or more. However, where the amount of Mo is too high, the effect thereof is saturated and cost rises. For this reason, the upper limit for the amount of Mo is 0.3% or less, more preferably 0.2% or less.

[V: More than 0% to 0.3%]

V is an element which refines the structure and increases strength and toughness and may be added as necessary. For the effect thereof to be advantageously demonstrated, the lower limit of the amount of V is set preferably to 0.03% or more, more preferably 0.05% or more. However, where the amount of V is too high, the effect thereof is saturated and cost rises. For this reason, the upper limit for the amount of V is 0.3% or less, more preferably 0.2% or less.

[Nb: More than 0% to 0.03%]

Nb is an element which refines the structure and increases strength and toughness and may be added as necessary. For the effect thereof to be advantageously demonstrated, the lower limit of the amount of Nb is set preferably to 0.003% or more, more preferably 0.005% or more. However, where the amount of Nb is too high, the processability is degraded. For this reason, the upper limit for the amount of Nb is 0.03% or less, more preferably 0.02% or less.

[Ca: More than 0% to 0.005%]

Ca is an element which is effective in spheroidizing sulfides in steel and increasing the stretch-flangeability. For the effect thereof to be advantageously demonstrated, the lower limit of the amount of Ca is set preferably to 0.0005% or more, more preferably 0.001% or more. However, where the amount of Ca is too high, the effect thereof is saturated and cost rises. For this reason, the upper limit for the amount of Ca is 0.005% or less, more preferably 0.003% or less.

The steel sheet in accordance with the present invention excels in ductility, stretch-flangeability, and weldability in a region with a tensile strength of 980 MPa or higher and a 0.2% yield strength of 700 MPa or higher.

A method for manufacturing the steel sheet in accordance with the present invention is explained hereinbelow.

The steel sheet of the present invention which fulfils the above requirements is characterized by being manufactured by adequately controlling, in particular, an annealing step after cold rolling among the hot rolling, cold rolling, and annealing (soaking and cooling) steps. The steps characterizing the present invention will be explained hereinbelow in the order of hot rolling, cold rolling, and then annealing.

Examples of the preferred conditions of hot rolling are described below.

Where the heating temperature before the hot rolling is low, the dissolution of carbides such as TiC in the austenite can be reduced. For this reason, the lower limit of the heating temperature before the hot rolling is preferably 1200° C. or higher, more preferably 1250° C. or higher. Where the heating temperature before the hot rolling is high, the cost is increased. For this reason, the upper limit for the heating temperature before the hot rolling is preferably 1350° C. or lowers, more preferably 1300° C. or lower.

Where the finish rolling temperature in hot rolling is low, the rolling cannot be performed in an austenite single-phase region and the microstructure may not be homogenized. For this reason, the finish rolling temperature is preferably 850° C. or higher, more preferably 870° C. or higher. Where the finish rolling temperature is high, the structure can be coarsened. For this reason, the finish rolling temperature is set to 980° C. or lower, more preferably 950° C. or lower.

The average cooling rate from the finish rolling in hot rolling to coiling is set with consideration for productivity, preferably to 10° C./s or higher, more preferably 20° C./s or higher. Meanwhile, where the average cooling rate is high, the equipment cost rises. Therefore, the average cooling rate is preferably 100° C./s or lower, more preferably 50° C./s or lower.

The preferred conditions of steps after the hot rolling are explained hereinbelow.

[Coiling Temperature CT after Hot Rolling: Preferably 660° C. or Higher]

Where the coiling temperature CT after hot rolling is less than 660° C., the surface layer of the hot-rolled sheet is decarburized, or an element concentration distribution is also formed in the surface layer of the annealed sheet due to the decrease in the amount of Mn and Cr solid solution in the surface layer, the amount of ferrite in the surface layer increases, and bending processability is improved. For this reason, the lower limit for CT is set preferably to 660° C. or higher, more preferably 670° C. or higher. Meanwhile, where the CT is too high, pickling ability required for scale removal is degraded. Therefore, the upper limit for CT is preferably 800° C. or less, more preferably 750° C. or less.

[Cold Rolling Draft: Preferably 20% to 60%]

The hot-rolled steel sheet is pickled for scale removal and supplied to cold rolling. Where the cold rolling draft during cold rolling is less than 20%, the sheet thickness needs to be decreased in the hot-rolling step in order to obtain a steel sheet of the desired thickness, and where the thickness is reduced in the hot rolling step, the steel sheet length is increased. As a result, the pickling time is extended and productivity is decreased. For this reason, the lower limit for the cold rolling draft is set preferably to 20% or more, more preferably 25% or more. Meanwhile, where the cold rolling draft exceeds 60%, a high-performance cold-rolling mill is required. For this reason, the upper limit for the cold rolling draft is preferably 60% or less, more preferably 55% or less, even more preferably 50% or less.

[Average Heating Rate During Annealing: Preferably 1° C./s to 20° C./s]

Where the average heating rate during annealing after the cold rolling is less than 1° C./s, the productivity is degraded. For this reason, the lower limit for the average heating rate is set to 1° C./s or more, more preferably 3° C./s or more, even more preferably 5° C./s or more. Meanwhile, where the average heating rate exceeds 20° C./s, the steel sheet temperature is difficult to control and the equipment cost rises. For this reason, the upper limit for the average heating rate is preferably 20° C./s or less, more preferably 18° C./s or less, even more preferably 15° C./s or less.

[Soaking Temperature T1 During Annealing: Ac3 Point+25° C. to Ac3 Point+70° C.]

Where the soaking temperature T1 during annealing after the cold rolling is less than Ac3 point+25° C., the amount of bainite or ferrite increases and the 0.2% yield strength is difficult to ensure. For this reason, the lower limit for the T1 is set to Ac3 point+25° C. or higher, preferably Ac3 point+35° C. or higher. Meanwhile, where the T1 exceeds Ac3 point+70° C., the amount of bainite decreases and the elongation and stretch-flangeability are degraded. For this reason, the upper limit for T1 is Ac3 point+70° C. or lower, preferably Ac3 point+60° C. or lower.

Here, the Ac3 point temperature is calculated on the basis of the following formula. In the formula, (%) stands for the content (% by mass) of each element. The formula is described in "The Physical Metallurgy of Steels" (William C. Leslie, p. 273; published by Maruzen).

$$Ac3=910-203\sqrt{(\% \text{ C})}-15.2(\% \text{ Ni})+44.7(\% \text{ Si})+104(\% \text{ V})+31.5(\% \text{ Mo})+13.1(\% \text{ W})-30(\% \text{ Mn})-11(\% \text{ Cr})-20(\% \text{ Cu})+700(\% \text{ P})+400(\% \text{ Al})+120(\% \text{ As})+400(\% \text{ Ti})$$

[Soaking Time: Preferably 1 s to 100 s]

Where the soaking time at the soaking temperature T1 is less than 1 s, the soaking effect cannot be sufficiently demonstrated. For this reason, the lower limit for the soaking time is set preferably to 1 s or more, more preferably to 10 s or more. Meanwhile, where the soaking time exceeds 100 s, the productivity is degraded. For this reason, the upper limit for the soaking time is preferably 100 s or less, more preferably 80 s or less.

Cooling to room temperature is performed after the soaking. The conditions for cooling to room temperature are controlled separately in the following two stages (1) and (2).

(1) Primary Cooling Step from the Soaking Temperature T1 to a Cooling Stop/Holding temperature T2:

[Cooling Stop/Holding Temperature T2: 460° C. to 550° C.]

The cooling is initially performed from the soaking temperature T1 to a cooling stop temperature (460° C. to 550° C.), and then holding is performed for a predetermined time (below-described t2) at the cooling stop temperature. In the present specification, the cooling stop temperature and holding temperature can be together referred to as cooling stop/holding temperature T2 for holding at the cooling stop temperature. Where the cooling stop/holding temperature T2 is less than 460° C., the amount of retained austenite increases and the stretch-flangeability is degraded. For this reason, the lower limit for the T2 is set to 460° C. or higher, preferably 480° C. or higher. Meanwhile, where the temperature of 550° C. is exceeded, the amount of bainite decreases, and the processability is degraded. For this reason, the upper limit for T2 is 550° C. or less, preferably 520° C. or less.

[Average Cooling Rate: Preferably 1° C./to 50° C./s]

Where the average cooling rate from the soaking temperature to the cooling stop/holding temperature T2 is less than 1° C./s, the productivity is degraded. For this reason, the lower limit for the average cooling rate is set preferably to 1° C./s or more, more preferably to 5° C./s or more. Meanwhile, where the average cooling rate exceeds 50° C./s, the steel sheet temperature is difficult to control and the equipment cost rises. For this reason, the upper limit for the average cooling rate is preferably 50° C./s or less, more preferably 40° C./s or less, even more preferably 30° C./s or less.

[Cooling Stop/Holding Time t2: 20 s to 100 s]

When the time of holding at the cooling stop/holding temperature T2 is denoted by t2, where the t2 is less than 20 s, the amount of bainite decreases and the processability is degraded. For this reason, the lower limit for the t2 is set to 20 s or more, preferably 25 s or more. Meanwhile, where the t2 exceeds 100 s, the amount of tempered martensite decreases and the strength is difficult to achieve. For this reason, the upper limit for the t2 is 100 s or less, preferably 80 s or less.

(2) Secondary Cooling Step from the Cooling Stop/Holding Temperature T2 to Room Temperature:

[Average Cooling Rate: Preferably 1° C./s to 20° C./s]

Cooling is then performed from the cooling stop/holding temperature T2 to room temperature. Where the average cooling rate in the secondary cooling step is less than 1° C./s, the productivity is degraded. Therefore, the lower limit for the average cooling rate in the secondary cooling step is set preferably to 1° C./s or more, more preferably 3° C./s or more. Meanwhile, where the average cooling rate exceeds 20° C./s, the equipment cost rises. For this reason, the upper limit of the average cooling rate is preferably 20° C./s or less, more preferably 15° C./s or less, even more preferably 10° C./s or less.

The present invention is also inclusive of a high-strength hot-dip galvanized steel sheet having a galvanized layer on the surface of the high-strength cold-rolled steel sheet, and a high-strength hot-dip galvannealed steel sheet having a galvannealed layer on the surface of the high-strength cold-rolled steel sheet. The high-strength hot-dip galvanized steel sheet in accordance with the present invention can be manufactured by performing galvanization by the usual method in the step with the cooling stop/holding temperature T2 or the secondary cooling step from the cooling stop/holding temperature T2 to room temperature. The high-strength hot-dip galvannealed steel sheet in accordance with the present invention can be manufactured by performing alloying by the usual method after performing the galvanization in the above manner.

This application claims the benefit of priority to Japanese Patent Application No. 2014-073441 filed on Mar. 31, 2014 and Japanese Patent Application No. 2015-015866 filed on Jan. 29, 2015. Japanese Patent Application No. 2014-073441 filed on Mar. 31, 2014 and Japanese Patent Application No. 2015-015866 filed on Jan. 29, 2015 are incorporated herein by reference in their entirety.

Examples

The present invention will be explained hereinbelow in greater detail by the examples thereof, but the present invention is not limited to the examples and can be practiced with modifications adaptable to the purposes described above and below, and all those modification are also included in the technical scope of the present invention.

Figure 1:
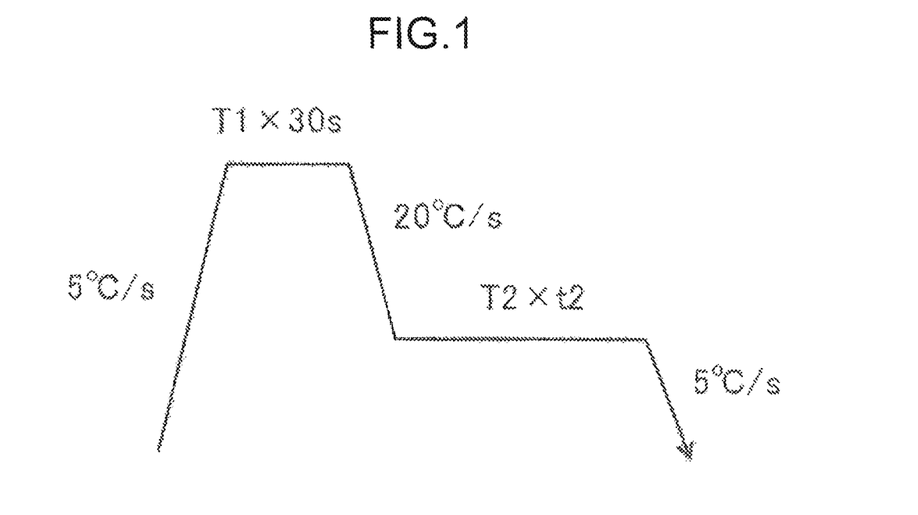
FIG. 1 is a conceptual diagram illustrating heat treatment conditions after hot rolling in the examples.

Steel ingots with component compositions presented in Table 1 below were vacuum melted. Then, the steel was heated to 1250° C. and hot rolled to a sheet thickness of 2.8 mm. The finish rolling temperature was 900° C., the average cooling rate from the finish rolling in hot rolling to coiling was 20° C./s, and the coiling temperature CT was such as indicated in Tables 2 and 3 below. The obtained hot-rolled steel sheets were pickled and then cold rolled to a sheet thickness of 2.0 mm. The heat treatment was then performed under the conditions presented in FIG. 1 and Tables 2 and 3. Temper rolling was then performed at an elongation ratio of 0.2%. The empty column in Table 1 means 0%.

TABLE 1

| Steel grade | Chemical component composition * (mass %) | | | | | | | | | | | | | | | Ac3 (° C.) |
|---|---|---|---|---|---|---|---|---|---|---|---|---|---|---|---|---|
| | C | Si | Mn | P | S | Al | Ti | B | Cu | Ni | Cr | Mo | V | Nb | Ca | |
| Steel 1 | 0.082 | 1.21 | 2.45 | 0.009 | 0.0009 | 0.041 | 0.0022 | 0.0023 | | | | | | | | 864 |
| Steel 2 | 0.099 | 1.35 | 2.44 | 0.009 | 0.0008 | 0.043 | 0.0019 | 0.0022 | | | | | | | | 864 |
| Steel 3 | 0.098 | 1.49 | 2.52 | 0.006 | 0.0008 | 0.042 | 0.0021 | 0.0029 | | | | | | | | 867 |
| Steel 4 | 0.101 | 1.57 | 2.43 | 0.012 | 0.0011 | 0.035 | 0.0023 | 0.0025 | | | | | | | | 874 |
| Steel 5 | 0.139 | 1.35 | 2.45 | 0.015 | 0.0012 | 0.033 | 0.0018 | 0.0033 | | | | | | | | 852 |
| Steel 6 | 0.098 | 1.20 | 2.28 | 0.005 | 0.0014 | 0.039 | 0.0012 | 0.0016 | 0.11 | 0.09 | | | | | | 852 |
| Steel 7 | 0.117 | 1.15 | 2.25 | 0.006 | 0.0013 | 0.032 | 0.0019 | 0.0019 | | 0.12 | | | | | | 847 |
| Steel 8 | 0.139 | 1.23 | 2.26 | 0.010 | 0.0015 | 0.035 | 0.0017 | 0.0023 | | | 0.05 | | | | | 849 |
| Steel 9 | 0.088 | 1.23 | 2.59 | 0.012 | 0.0015 | 0.043 | 0.0020 | 0.0022 | | | | 0.06 | | | | 863 |
| Steel 10 | 0.090 | 1.25 | 2.43 | 0.011 | 0.0013 | 0.040 | 0.0021 | 0.0025 | | | | | 0.12 | | | 877 |
| Steel 11 | 0.111 | 1.43 | 2.34 | 0.014 | 0.0012 | 0.034 | 0.0019 | 0.0031 | | | | | | 0.005 | | 867 |
| Steel 12 | 0.123 | 1.54 | 2.33 | 0.013 | 0.0011 | 0.039 | 0.0023 | 0.0032 | | | | | | | 0.0025 | 872 |
| Steel 13 | 0.104 | 1.24 | 2.32 | 0.012 | 0.0011 | 0.038 | 0.0022 | 0.0035 | | 0.04 | | | 0.05 | | | 867 |
| Steel 14 | 0.091 | 1.19 | 2.29 | 0.012 | 0.0011 | 0.037 | 0.0020 | 0.0020 | | | | 0.04 | | 0.009 | 0.0019 | 864 |
| Steel 15 | 0.049 | 1.22 | 2.11 | 0.010 | 0.0010 | 0.030 | 0.0020 | 0.0015 | | | | | | | | 883 |
| Steel 16 | 0.198 | 1.33 | 2.38 | 0.014 | 0.0014 | 0.031 | 0.0015 | 0.0021 | | | | | | | | 836 |
| Steel 17 | 0.099 | 0.98 | 2.03 | 0.010 | 0.0015 | 0.038 | 0.0022 | 0.0029 | | | | | | | | 860 |
| Steel 18 | 0.111 | 1.35 | 1.82 | 0.017 | 0.0009 | 0.040 | 0.0012 | 0.0014 | | | | | | | | 881 |
| Steel 19 | 0.121 | 1.44 | 3.25 | 0.014 | 0.0019 | 0.040 | 0.0011 | 0.0013 | | | | | | | | 836 |
| Steel 20 | 0.115 | 1.33 | 2.33 | 0.013 | 0.0008 | 0.045 | 0.0005 | 0.0025 | | | | | | | | 860 |
| Steel 21 | 0.134 | 1.22 | 2.44 | 0.015 | 0.0010 | 0.033 | 0.0076 | 0.0021 | | | | | | | | 871 |
| Steel 22 | 0.082 | 1.43 | 2.34 | 0.010 | 0.0011 | 0.045 | 0.0023 | 0.0005 | | | | | | | | 880 |

* The remainder is iron and inevitable impurities other than P and S.

TABLE 2

| | | | Annealing process | | | | |
|---|---|---|---|---|---|---|---|
| | | | Heating | | | Primary cooling | |
| Test No. | Steel grade | After hot rolling Coiling temperature CT (° C.) | Soaking temperature during annealing T1 (° C.) | Ac3 + 25 (° C.) | Ac3 + 75 (° C.) | Cooling stop/ holding temperature T2 (° C.) | Cooling stop/ holding time t2 (sec) |
| 1 | Steel 1 | 660 | 890 | 889 | 939 | 500 | 30 |
| 2 | Steel 2 | 660 | 910 | 889 | 939 | 500 | 30 |
| 3 | Steel 3 | 660 | 930 | 892 | 942 | 500 | 30 |
| 4 | Steel 4 | 660 | 930 | 899 | 949 | 500 | 30 |
| 5 | Steel 5 | 660 | 910 | 877 | 927 | 500 | 30 |
| 6 | Steel 6 | 660 | 890 | 877 | 927 | 500 | 30 |
| 7 | Steel 7 | 660 | 890 | 872 | 922 | 500 | 30 |
| 8 | Steel 8 | 660 | 890 | 874 | 924 | 500 | 30 |
| 9 | Steel 9 | 660 | 890 | 888 | 938 | 500 | 30 |
| 10 | Steel 10 | 660 | 910 | 902 | 952 | 500 | 30 |
| 11 | Steel 11 | 660 | 910 | 892 | 942 | 500 | 30 |
| 12 | Steel 12 | 660 | 910 | 897 | 947 | 500 | 30 |
| 13 | Steel 13 | 660 | 900 | 892 | 942 | 500 | 30 |
| 14 | Steel 14 | 660 | 890 | 889 | 939 | 500 | 30 |
| 15 | Steel 1 | 500 | 890 | 889 | 939 | 500 | 30 |
| 16 | Steel 1 | 600 | 890 | 889 | 939 | 500 | 30 |
| 17 | Steel 1 | 700 | 890 | 889 | 939 | 500 | 30 |
| 18 | Steel 15 | 660 | 890 | 908 | 958 | 500 | 30 |
| 19 | Steel 16 | 660 | 910 | 861 | 911 | 500 | 30 |

TABLE 2-continued

| | | | Annealing process | | | | |
| | | | Heating | | | Primary cooling | |
| Test No. | Steel grade | After hot rolling Coiling temperature CT (° C.) | Soaking temperature during annealing T1 (° C.) | Ac3 + 25 (° C.) | Ac3 + 75 (° C.) | Cooling stop/ holding temperature T2 (° C.) | Cooling stop/ holding time t2 (sec) |
|---|---|---|---|---|---|---|---|
| 20 | Steel 17 | 660 | 910 | 885 | 935 | 500 | 30 |
| 21 | Steel 18 | 660 | 910 | 896 | 946 | 500 | 30 |
| 22 | Steel 19 | 660 | 930 | 905 | 955 | 500 | 30 |
| 23 | Steel 20 | 660 | 890 | 885 | 935 | 500 | 30 |
| 24 | Steel 21 | 660 | 910 | 896 | 946 | 500 | 30 |
| 25 | Steel 22 | 660 | 910 | 905 | 955 | 500 | 30 |

TABLE 3

| | | | Annealing process | | | | |
| | | | Heating | | | Primary cooling | |
| Test No. | Steel grade | After hot rolling Coiling temperature CT (° C.) | Soaking temperature during annealing T1 (° C.) | Ac3 + 25 (° C.) | Ac3 + 75 (° C.) | Cooling stop/ holding temperature T2 (° C.) | Cooling stop/ holding time t2 (sec) |
|---|---|---|---|---|---|---|---|
| 26 | Steel 1 | 660 | 890 | 889 | 939 | 450 | 30 |
| 27 | Steel 1 | 660 | 890 | 889 | 939 | 600 | 30 |
| 28 | Steel 1 | 660 | 890 | 889 | 939 | 500 | 10 |
| 29 | Steel 1 | 660 | 890 | 889 | 939 | 500 | 1000 |
| 30 | Steel 1 | 660 | 850 | 889 | 939 | 500 | 30 |
| 31 | Steel 5 | 660 | 960 | 877 | 927 | 500 | 30 |
| 32 | Steel 1 | 660 | 870 | 889 | 939 | 500 | 30 |
| 33 | Steel 2 | 660 | 870 | 889 | 939 | 500 | 30 |
| 34 | Steel 3 | 660 | 880 | 892 | 942 | 500 | 30 |
| 35 | Steel 4 | 660 | 890 | 899 | 949 | 500 | 30 |
| 36 | Steel 6 | 660 | 870 | 877 | 927 | 500 | 30 |
| 37 | Steel 7 | 660 | 860 | 872 | 922 | 500 | 30 |
| 38 | Steel 9 | 660 | 870 | 888 | 938 | 500 | 30 |
| 39 | Steel 10 | 660 | 870 | 902 | 952 | 500 | 30 |
| 40 | Steel 11 | 660 | 870 | 892 | 942 | 500 | 30 |
| 41 | Steel 12 | 660 | 870 | 897 | 947 | 500 | 30 |
| 42 | Steel 13 | 660 | 870 | 892 | 942 | 500 | 30 |
| 43 | Steel 14 | 660 | 870 | 889 | 939 | 500 | 30 |
| 44 | Steel 1 | 500 | 870 | 889 | 939 | 500 | 30 |
| 45 | Steel 1 | 600 | 870 | 889 | 939 | 500 | 30 |
| 46 | Steel 1 | 700 | 870 | 889 | 939 | 500 | 30 |

Structure fractions and properties were measured in the following manner with respect to each of the obtained cold-rolled steel sheet.

[Structure Fractions]

In the examples, the fractions of martensite, bainite, ferrite, and retained austenite which are present in the t/4 portion of the steel sheet and the fractions of martensite, bainite, and ferrite which are present at the 20 μm position (surface layer portion) from the outermost surface layer portion of the steel sheet were measured in the following manner. With the manufacturing methods of the present example, the probability of structures other than those described hereinabove being present in either region is extremely low. For this reason, structures other than those described hereinabove were not measured. The calculations were performed such that in the t/4 portion of the steel sheet, the total of martensite, bainite, ferrite, and retained austenite was 100 area %, and in the surface layer portion, the total of martensite, bainite, and ferrite was 100 area %.

In the present invention, as mentioned hereinabove, martensite was distinguished in detail depending on the location in the steel sheet, and the martensite present in the t/4 portion of the steel sheet was determined as tempered martensite. Meanwhile, the martensite present in the surface layer portion of the steel sheet was determined as martensite including both tempered martensite and quenched martensite. In the "Structure fraction" column, those are not distinguished from each other and referred to simply as "martensite".

More specifically, the amount of retained austenite was measured by an X-ray diffraction method after cutting a 2 mm×20 mm×20 mm testpiece from the steel sheet, grinding to the t/4 portion of the sheet thickness, and then chemically polishing (ISIJ Int. Vol. 33 (1933), No. 7, P. 776). In the present example, only the retained austenite, among the structures that could be contained in each region, was measured by the X-ray diffraction method, and other structures, such as ferrite, were measured by a point algorithm method after nital etching, as will be described hereinabove. The reason therefor is that where nital etching is performed, the carbides such as retained austenite and cementite are all observed as white or gray structures and cannot be distinguished from each other.

Ferrite, bainite, and martensite were measured in the following manner by the point algorithm method.

A 2 mm×20 mm×20 mm testpiece was cut out from the steel sheet, a cross section parallel to the rolling direction was polished, nital etching was performed, and the structures in the ¼ portion of the steel thickness t and the surface layer portion were observed (magnification 3000) under a SEM (Scanning Electron Microscope). The observations were performed using a 2-μm-period grating with respect to 20 μm×20 μm per 1 field of view, ferrite, bainite, and martensite were distinguished on the basis of color or size of grains, and the area ratio of each structure was measured. The measurements were performed for a total of 5 fields of view, and the average value thereof was determined.

More specifically, in the SEM photograph after the nital etching, (i) the structure that appears white is martensite, retained austenite, or cementite, and (ii) the structure that appears black is bainite or ferrite.

In the (i), in the present example, the structure with a size of about 5 μm$^2$ or more was determined to be martensite.

In the (ii), when the interior of the structure that appeared black was observed, the structure with less than 3 white or gray portions (substantially considered as cementite) present in the black structure was determined to be ferrite, and the structure with 3 or more such portions was determined to be bainite.

Basically, each structure can be distinguished by the (i) and (ii) methods, but where a structure is of a gray color which is close to a black color, martensite and bainite are sometimes difficult to distinguish from each other. In such a case, as depicted in FIGS. 2 and 3, the interior of the structure of a gray color which is close to a black color is observed, the attention is focused on white or gray portions (described hereinbelow as white portions) present in the interior, and the structures are distinguished by the size or number of such portions.

Figure 2:
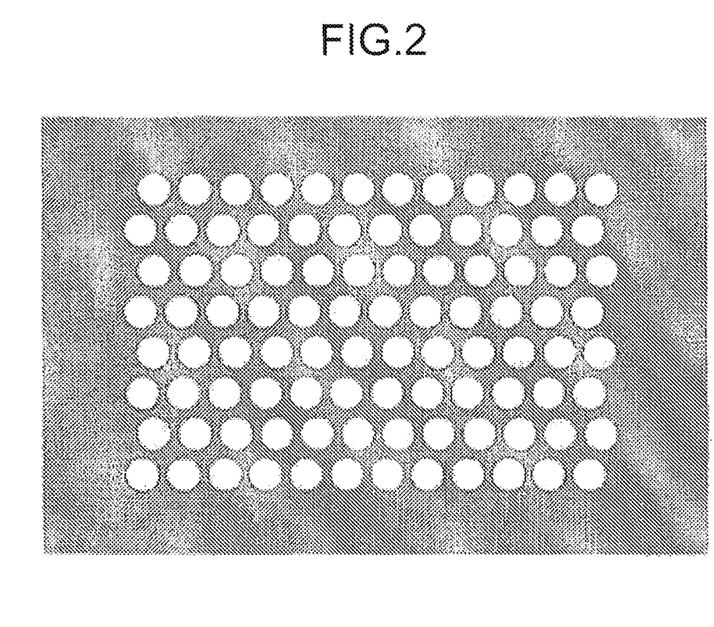
FIG. 2 is a conceptual schematic diagram illustrating martensite when a portion of a gray color close to a black color in present in SEM observations after nital etching.

More specifically, as depicted in FIG. 2, the structure with a large number of fine white portions present inside a section of a gray color close to a black color was taken to be martensite. Thus, a distance between the center positions of adjacent white portions was measured, and the structure with the shortest distance, that is, the distance of closest approach of less than 0.5 μm, was taken to be martensite.

Figure 3:
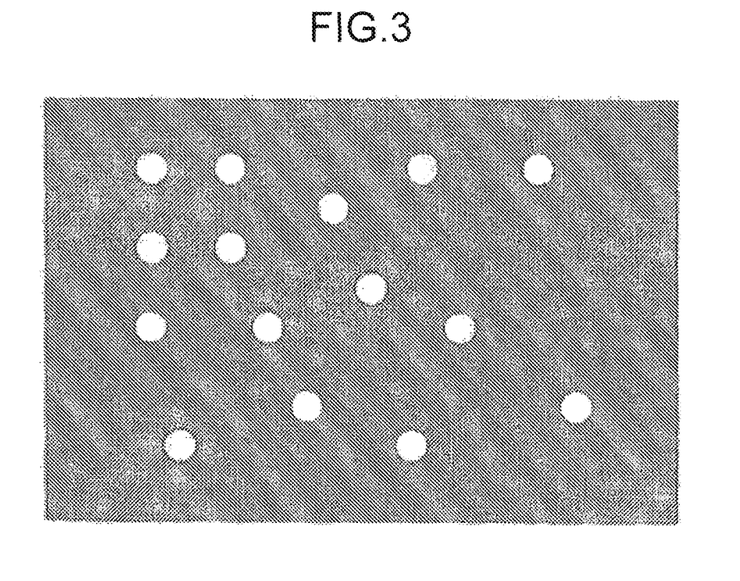
FIG. 3 is a conceptual schematic diagram illustrating bainite when a portion of a gray color close to a black color in present in SEM observations after nital etching.

Meanwhile, the structure in which a small number of white portions were sparsely present inside a section of a gray color close to a black color, as depicted in FIG. 3, was taken to be bainite. More specifically, when the number of the white portions was 3 or more and the distance of closest approach of the adjacent white portions was measured in the same manner as for martensite, the structure with this distance being 0.5 μm or more was determined to be bainite.

As described hereinabove, in the present example, retained austenite and other structures (ferrite, bainite, and martensite) are measured by different methods, and the total of these structure does not necessarily take 100 area %. Accordingly, when the area fractions of ferrite, bainite, and martensite were determined, the adjustment was made such that the total of all structures became 100 area %. More specifically, the fractions of ferrite, bainite, and martensite determined by the point algorithm method were proportionally redistributed in the numerical value obtained by subtracting the fraction of retained austenite measured by the X-ray diffraction method from 100%, and finally the fractions of ferrite, bainite, and martensite were determined.

Further, in the present invention, the presence/absence of ferrite was confirmed by using an IQ based on the EBSD pattern sharpness. First, the reason for using such an indicator will be explained.

As mentioned hereinabove, in the steel sheet in accordance with the present invention, tempered martensite and bainite are the main structure and the percentage of ferrite is reduced. It is most preferred that the percentage of ferrite be zero, that is, that ferrite be not present. The ferrite fraction can be measured by the above point algorithm method, but it may be difficult to identify ferrite and other structures, such as bainite, clearly at all times. For this reason, in the present example, the presence/absence of ferrite is evaluated on the basis of the IQ, in addition to using the point algorithm method.

As mentioned hereinabove, the IQ is an EBSD pattern sharpness. Further, the IQ is known to be affected by the amount of strains in the crystals, and the presence of strains in the crystals tends to increase with the decrease in the IQ. Therefore, since martensite with a high dislocation density includes distortions of the crystal structure, the IQ value tends to decrease, whereas since ferrite has a low dislocation density, the IQ value tends to increase. Accordingly, for example, a method has been heretofore suggested by which the absolute value of IQ is taken as an indicator and, for example, the structure with an IQ value of 4000 or more is determined to be ferrite. However, the investigation results obtained by inventors have demonstrated that the method based on the absolute value of IQ is easily affected by, for example, a detector or polishing conditions used to observe the structure and the absolute value of IQ easily fluctuates.

Accordingly, the inventors have prepared a steel sheet (containing no ferrite) that fulfils the requirements of the present invention and a steel sheet with a large amount of ferrite, and have investigated in detail the relationship between the IQ and the presence/absence of ferrite. The results have demonstrated that when the presence/absence of ferrite is determined, effective relativization can be performed by using IQmin (the minimum value among all of the IQ data) and IQmax (the maximum value among all of the IQ data), and a correlation has been found between the presence/absence of ferrite and the ratio of the number of measurement points with the IQ equal to or greater than a certain value in the total number of the measurement points of IQ. More specifically, it was found that when the IQ value [IQ(F)] of ferrite (F) is calculated on the basis of the following Math. Formula (1), and a value obtained by dividing the number of the measurement points at which the IQ is equal to or greater than the Math. Formula (1) by the total number of the measurement points and then multiplying by 100 is 5% or less, it can be determined that ferrite is not present.

$$IQ(F)=0.91\times(IQmax-IQmin)+IQmin \qquad (1)$$

In the formula, IQmin is the minimum value among all of the IQ data, and IQmax is the maximum value among all of the IQ data.

The IQ value was measured in the following manner. Initially, a sample was prepared by mechanically polishing a cross section parallel to the rolling direction in the t/4 region, where t stands for the thickness of the steel sheet. Then, the sample was set and inclined at 70° in the OIM system manufactured by TexSEM Laboratories, Inc., and a 100 μm×100 μm region was taken as a measurement field of view. EBSD measurements on 180,000 points were then performed at an accelerating voltage of 20 kV with 1 step of 0.25 μm, and the IQ value of a BCT (Body Centered Tetragonal)—including BCC (Body Centered Cubic) crystal was measured. Here, the body centered tetragonal lattice is unidirectionally extended as a result of C atoms forming a solid solution at specific interstitial positions in the body centered cubic lattice, and the structure itself is the same as the body centered cubic lattice. Thus, those lattices cannot be distinguished from one another even by the EBSD. For this reason, in the present example, the body centered tetragonal lattice was included in the measurements of the body centered cubic lattice.

Figure 4:
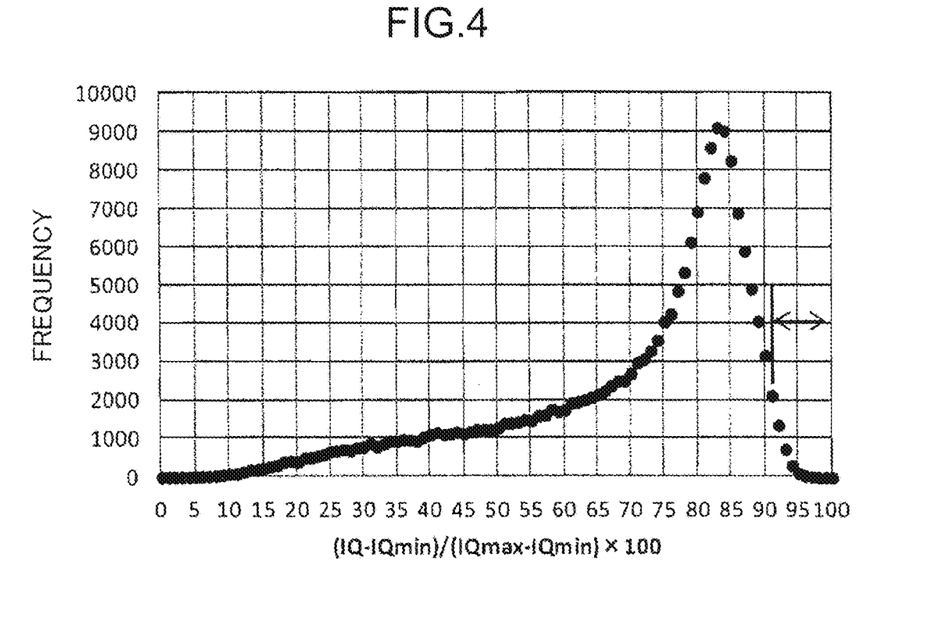
FIG. 4 illustrates an IQ histogram in EBSD measurements in the examples.

An example of IQ histogram obtained by the above method is depicted in FIG. 4 for reference. In FIG. 4, [(IQ(F)−IQmin)/(IQmax−IQmin)×100], which is plotted against the abscissa, is the left side of Math. Formula (1A) obtained by the following transformation of Math. Formula (1). The frequency (total number of the measurement points) is plotted against the ordinate. A region in which the value on the abscissa in FIG. 4 is equal to or greater than 91% of the total number of the measurement points is represented by arrows on the right side in FIG. 4. Thus, the region represented by the arrows is equal to or greater than Math. Formula (1). Where a value obtained by dividing the number of the measurement points in the region by the total number of the measurement points and then multiplying by 100 is 5% or less, it means that ferrite is not present.

$$(IQ(F)-IQmin)/(IQmax-IQmin) \times 100 \geq 91 \quad (1A)$$

[Tensile Properties]

The tensile strength (TS), 0.2% yield strength (YS), and elongation (El) as a ductility indicator were determined by sampling a JIS 5 testpiece (gauge length 50 mm, parallel portion width 25 mm) such that the lengthwise direction of the testpiece was perpendicular to the rolling direction of the cold-rolled steel, and the testpiece was tested according to JIS Z 2241. The elongation (El) is described hereinbelow as ductility (El). The stretch-flangeability (λ) was determined by sampling a 2 mm×90 mm×90 mm testpiece from the cold-rolled steel sheet and testing the testpiece according to JIS Z 2256.

[Weldability]

To evaluate the weldability, a testpiece was sampled from the cold-rolled steel sheet and welded to the same steel sheet, and a cross tensile strength (CTS) was measured according to JIS Z 3137. More specifically, a Cu—Cr electrode of a dome radius type with a tip diameter of 8 mm was used as an electrode, the welding time was set to 20 cycles/60 Hz, the pressurizing force was set to 400 kgf, and the CTS was measured under the condition of a welding diameter (see JIS Z 3137) being 6 mm by changing the current value.

[Bending Processability]

The bending processability (R/t) was determined by sampling a 2 mm×40 mm×100 mm testpiece from the cold-rolled steel sheet such that the lengthwise direction of the testpiece was perpendicular to the rolling direction, a test was performed according to a V block method of JIS Z 2248, and a minimum bending radius R at which no fracture or cracking was observed was measured. The bending direction was the testpiece lengthwise direction. A value obtained by dividing the R determined by the bending test by a nominal sheet thickness of 2 mm was taken as R/t.

(i) For steel sheets with a tensile strength of 980 MPa to less than 1180 MPa and a 0.2% yield strength of 700 MPa or more, the ductility (El) of 14% or more and the stretch-flangeability (λ) of 20% or more were determined to be acceptable. The bending processability (R/t) or 2.5 or less was determined to be good. For weldability, the CTS of 20,000 N or more was determined to be acceptable. For each region, higher El, λ, and CTS and lower R/t were preferred.

(ii) Meanwhile, for steel sheets with a tensile strength of 1180 MPa to than 1370 MPa and a 0.2% yield strength of 700 MPa or more, the ductility (El) of 11% or more and the stretch-flangeability (λ) of 20% or more were determined to be acceptable. The bending processability (R/t) or 2.5 or less was determined to be good. For weldability, the CTS of 20,000 N or more was determined to be acceptable. For each region, higher El, λ, and CTS and lower R/t were preferred. The results are shown in Tables 4 and 5.

TABLE 4

| | | Metal structure in t/4 portion (area %) | | | | | Metal structure in 20 μm surface layer portion (area %) | |
|---|---|---|---|---|---|---|---|---|
| | | | | Tempered | | | | |
| Test No. | Steel grade | Tempered martensite | Bainite | martensite + bainite | Ferrite | Retained austenite | Ferrite | Martensite + bainite |
| 1 | Steel 1 | 34 | 65 | 99 | 0 | 1 | 93 | 7 |
| 2 | Steel 2 | 71 | 28 | 99 | 0 | 1 | 94 | 6 |
| 3 | Steel 3 | 83 | 16 | 99 | 0 | 1 | 93 | 7 |
| 4 | Steel 4 | 80 | 18 | 98 | 0 | 2 | 93 | 7 |
| 5 | Steel 5 | 83 | 16 | 99 | 0 | 1 | 95 | 5 |
| 6 | Steel 6 | 33 | 66 | 99 | 0 | 1 | 91 | 9 |
| 7 | Steel 7 | 32 | 68 | 100 | 0 | 0 | 93 | 7 |
| 8 | Steel 8 | 79 | 20 | 99 | 0 | 1 | 94 | 6 |
| 9 | Steel 9 | 46 | 54 | 100 | 0 | 0 | 88 | 12 |
| 10 | Steel 10 | 33 | 66 | 99 | 0 | 1 | 92 | 8 |
| 11 | Steel 11 | 77 | 22 | 99 | 0 | 1 | 91 | 9 |
| 12 | Steel 12 | 79 | 20 | 99 | 0 | 1 | 91 | 9 |
| 13 | Steel 13 | 32 | 67 | 99 | 0 | 1 | 94 | 6 |
| 14 | Steel 14 | 32 | 68 | 100 | 0 | 0 | 90 | 10 |
| 15 | Steel 1 | 34 | 65 | 99 | 0 | 1 | 74 | 26 |
| 16 | Steel 1 | 33 | 67 | 100 | 0 | 0 | 78 | 22 |
| 17 | Steel 1 | 36 | 64 | 100 | 0 | 0 | 95 | 5 |
| 18 | Steel 15 | 25 | 0 | 25 | 75 | 0 | 94 | 6 |
| 19 | Steel 16 | 99 | 0 | 99 | 0 | 1 | 91 | 9 |
| 20 | Steel 17 | 53 | 47 | 100 | 0 | 0 | 92 | 8 |
| 21 | Steel 18 | 54 | 46 | 100 | 0 | 0 | 91 | 9 |
| 22 | Steel 19 | 100 | 0 | 100 | 0 | 0 | 91 | 9 |
| 23 | Steel 20 | 46 | 41 | 87 | 12 | 1 | 94 | 6 |
| 24 | Steel 21 | 76 | 23 | 99 | 0 | 1 | 90 | 10 |

TABLE 4-continued

| | | | | | | | | |
|---|---|---|---|---|---|---|---|---|
| 25 | Steel 22 | 35 | 40 | 75 | 25 | 0 | 88 | 12 |

| | | Tensile properties | | | | | |
|---|---|---|---|---|---|---|---|
| Test No. | TS (MPa) | 0.2% Yield strength YS (MPa) | EI (%) | λ (%) | Weldability CTS (N) | Bending processability R/t |
| 1 | 1025 | 702 | 15 | 28 | 23000 | 2.5 |
| 2 | 1035 | 724 | 15 | 28 | 23000 | 2.5 |
| 3 | 1105 | 765 | 14 | 28 | 23500 | 2.5 |
| 4 | 1067 | 733 | 14 | 23 | 23250 | 1.8 |
| 5 | 1232 | 815 | 12 | 21 | 21500 | 2.5 |
| 6 | 1015 | 712 | 15 | 24 | 23350 | 2.5 |
| 7 | 985 | 701 | 15 | 29 | 23000 | 2.5 |
| 8 | 1213 | 805 | 12 | 24 | 23250 | 2.5 |
| 9 | 1077 | 754 | 14 | 26 | 23300 | 2.5 |
| 10 | 1018 | 717 | 14 | 25 | 23500 | 2.5 |
| 11 | 1064 | 725 | 15 | 29 | 23550 | 2.5 |
| 12 | 1084 | 727 | 14 | 28 | 23750 | 2.5 |
| 13 | 1019 | 734 | 15 | 25 | 23900 | 2.5 |
| 14 | 1022 | 714 | 15 | 27 | 23350 | 2.5 |
| 15 | 1033 | 743 | 15 | 24 | 23900 | 4.0 |
| 16 | 1033 | 732 | 15 | 29 | 23300 | 3.5 |
| 17 | 1043 | 750 | 15 | 22 | 23300 | 2.5 |
| 18 | 724 | 531 | 19 | 25 | 23900 | 2.5 |
| 19 | 1545 | 924 | 8 | 8 | 17050 | 4.5 |
| 20 | 875 | 612 | 14 | 22 | 23250 | 3.0 |
| 21 | 813 | 548 | 19 | 20 | 22800 | 2.5 |
| 22 | 1382 | 1004 | 8 | 10 | 23300 | 4.0 |
| 23 | 931 | 619 | 16 | 11 | 23500 | 2.5 |
| 24 | 1252 | 834 | 10 | 13 | 23000 | 3.0 |
| 25 | 901 | 562 | 16 | 10 | 23900 | 2.5 |

TABLE 5

| | | Metal structure in t/4 portion (area %) | | | | | Metal structure in 20 μm surface layer portion (area %) | |
|---|---|---|---|---|---|---|---|---|
| | | | | Tempered | | | | |
| Test No. | Steel grade | Tempered martensite | Bainite | martensite + bainite | Ferrite | Retained austenite | Ferrite | Martensite + bainite |
| 26 | Steel 1 | 30 | 65 | 95 | 0 | 5 | 91 | 9 |
| 27 | Steel 1 | 90 | 10 | 100 | 0 | 0 | 90 | 10 |
| 28 | Steel 1 | 95 | 5 | 100 | 0 | 0 | 92 | 8 |
| 29 | Steel 1 | 8 | 92 | 100 | 0 | 0 | 94 | 6 |
| 30 | Steel 1 | 52 | 0 | 52 | 46 | 7 | 94 | 6 |
| 31 | Steel 5 | 100 | 0 | 100 | 0 | 0 | 90 | 10 |
| 32 | Steel 1 | 27 | 72 | 99 | 0 | 1 | 93 | 7 |
| 33 | Steel 2 | 25 | 75 | 100 | 0 | 0 | 95 | 5 |
| 34 | Steel 3 | 28 | 72 | 100 | 0 | 0 | 92 | 8 |
| 35 | Steel 4 | 26 | 73 | 99 | 0 | 1 | 94 | 6 |
| 36 | Steel 6 | 23 | 77 | 100 | 0 | 0 | 92 | 8 |
| 37 | Steel 7 | 25 | 75 | 100 | 0 | 0 | 91 | 9 |
| 38 | Steel 9 | 28 | 72 | 100 | 0 | 0 | 91 | 9 |
| 39 | Steel 10 | 24 | 75 | 99 | 0 | 1 | 93 | 7 |
| 40 | Steel 11 | 29 | 71 | 100 | 0 | 0 | 91 | 9 |
| 41 | Steel 12 | 27 | 72 | 99 | 0 | 1 | 92 | 8 |
| 42 | Steel 13 | 23 | 77 | 100 | 0 | 0 | 95 | 5 |
| 43 | Steel 14 | 21 | 78 | 99 | 0 | 1 | 93 | 7 |
| 44 | Steel 1 | 25 | 74 | 99 | 0 | 1 | 75 | 25 |
| 45 | Steel 1 | 26 | 74 | 100 | 0 | 0 | 78 | 22 |
| 46 | Steel 1 | 24 | 76 | 100 | 0 | 0 | 94 | 6 |

| | | Tensile properties | | | | | |
|---|---|---|---|---|---|---|---|
| Test No. | TS (MPa) | 0.2% Yield strength YS (MPa) | EI (%) | λ (%) | Weldability CTS (N) | Bending processability R/t |
| 26 | 972 | 680 | 16 | 14 | 23350 | 2.5 |
| 27 | 1111 | 734 | 10 | 16 | 23300 | 2.5 |
| 28 | 1124 | 774 | 10 | 31 | 23400 | 2.5 |
| 29 | 953 | 653 | 15 | 26 | 23900 | 2.5 |
| 30 | 950 | 603 | 18 | 12 | 23050 | 2.5 |

TABLE 5-continued

| | | | | | | |
|---|---|---|---|---|---|---|
| 31 | 1315 | 859 | 10 | 17 | 21300 | 2.5 |
| 32 | 1000 | 673 | 17 | 19 | 23050 | 2.5 |
| 33 | 1005 | 690 | 18 | 18 | 22950 | 2.5 |
| 34 | 1087 | 695 | 16 | 19 | 22250 | 2.5 |
| 35 | 1037 | 680 | 16 | 16 | 23000 | 2.5 |
| 36 | 981 | 689 | 16 | 22 | 23300 | 2.5 |
| 37 | 980 | 669 | 17 | 27 | 23000 | 2.5 |
| 38 | 1033 | 696 | 15 | 23 | 23250 | 2.5 |
| 39 | 999 | 689 | 16 | 20 | 23000 | 2.5 |
| 40 | 1021 | 688 | 16 | 22 | 23550 | 2.5 |
| 41 | 1060 | 694 | 15 | 25 | 23650 | 2.5 |
| 42 | 986 | 697 | 15 | 23 | 23850 | 2.5 |
| 43 | 1000 | 670 | 17 | 20 | 23350 | 2.5 |
| 44 | 1001 | 698 | 15 | 20 | 23600 | 4.0 |
| 45 | 1005 | 689 | 16 | 22 | 23300 | 4.0 |
| 46 | 1012 | 693 | 16 | 19 | 23350 | 2.5 |

The following conclusions can be made from Tables 4 and 5. Tests No. 1 to No. 17 in Table 4 are examples of the present invention that used steel grades 1 to 14 in Table 1 having the compositions in accordance with the present invention and were manufactured under the preferred heat treatment conditions of the present invention corresponding to Tests No. 1 to No. 17 in Table 2. In these examples, all of the total area ratio of tempered martensite and bainite inside the steel sheet (t/4), area ratio of tempered martensite, area ratio of bainite, area ratio of ferrite, and area ratio of retained austenite fulfilled the requirements of the present invention. For this reason, the tensile strength of 980 MPa or higher, 0.2% yield strength of 700 MPa or higher, and excellent ductility (El), stretch flangeability (λ), and weldability (CTS) were obtained.

Among the examples, Tests No. 1 to No. 14 and No. 17 fulfill the requirements of the present invention relating to the structure of the t/4 portion and composition and have the preferred structure of the surface layer portion. Meanwhile, Tests No. 15 and No. 16 fulfill the requirements of the present invention relating to the structure of the t/4 portion and composition, but the total area ratio of martensite and bainite in the surface layer portion is greater than the preferred range and the area ratio of ferrite is lower than the preferred range because the CT (° C.) decreased. Comparing Tests No. 1 to No. 14 and No. 17 with Tests No. 15 and No. 16, Tests No. 1 to No. 14 and No. 17 were superior to Tests No. 15 and No. 16 in the bending processability (R/t). In particular, since Tests No. 1 and No. 17 used the steel grade 1 of the same composition as that of Tests No. 15 and No. 16, it is clear that reducing the total area ratio of martensite and bainite in the surface layer portion and increasing the area ratio of ferrite are effective for increasing the bending processability (R/t).

By contrast, it was confirmed that the desirable properties could not be obtained in the below-described examples that did not fulfil the requirements of the present invention.

Tests No. 18 to No. 25 in Table 4 are examples that used steel grades 15 to 22 in Table 1 which did not have the composition in accordance with the present invention and were manufactured under the heat treatment conditions of Tests No. 18 to No. 25 in Table 2.

Test No. 18 is an example that used steel grade 15 in Table 1 with a small amount of C and was manufactured by reducing the T1 (° C.). In this example, the total area ratio of tempered martensite and bainite and the area ratio of tempered martensite decreased. As a result, the tensile strength (TS) and 0.2% yield strength (YS) decreased. Further, bainite was not formed, but the area ratio of ferrite increased. As a result the ductility (El) and stretch-flangeability (λ) did not decrease.

Test No. 19 is an example that used steel grade 16 in Table 1 with a large amount of C and was manufactured by increasing the T1 (° C.). In this example, bainite was not formed and only tempered martensite was formed. For this reason, the tensile strength (TS) and 0.2% yield strength (YS) greatly increased. As a result, the ductility (El) and stretch-flangeability (λ) decreased. Further, since the amount of C was large, the weldability (CTS) also decreased. In addition, since the tensile strength (TS) and 0.2% yield strength (YS) greatly increased, although the surface layer portion had the preferred structure in accordance with the present invention, the bending processability (R/t) decreased.

Test No. 20 is an example that used steel grade 17 in Table 1 with a small amount of Si, and the tensile strength (TS) and 0.2% yield strength (YS) decreased. In addition, since the amount of Si was small, although the surface layer portion had the preferred structure in accordance with the present invention, the bending processability (R/t) decreased.

Test No. 21 is an example that used steel grade 18 in Table 1 with a small amount of Mn, and the tensile strength (TS) and 0.2% yield strength (YS) decreased. The amount of P was large, but the effect of increasing the stretch-flangeability (λ) resulting from a small amount of Mn was large, and the stretch-flangeability (λ) did not decrease.

Test No. 22 is an example that used steel grade 19 in Table 1 with a large amount of Mn. In this example, bainite was not formed and only tempered martensite was formed. For this reason, the tensile strength (TS) and 0.2% yield strength (YS) greatly increased. As a result, the ductility (El) and stretch-flangeability (λ) decreased. Further, since the tensile strength (TS) and 0.2% yield strength (YS) greatly increased, although the surface layer portion had the preferred structure in accordance with the present invention, the bending processability (R/t) decreased.

Test No. 23 is an example that used steel grade 20 in Table 1 with a small amount of Ti. In this example, the area ratio of ferrite increased and the total area ratio of tempered martensite and bainite decreased. For this reason, the tensile strength (TS), 0.2% yield strength (YS), and stretch-flangeability (λ) decreased.

Test No. 24 is an example that used steel grade 21 in Table 1 with a large amount of Ti. In this example, the tensile strength (TS) and 0.2% yield strength (YS) increased. As a result, the ductility (El) and stretch-flangeability (λ) decreased. Further, since the tensile strength (TS) and 0.2% yield strength (YS) increased, although the surface layer portion had the preferred structure in accordance with the present invention, the bending processability (R/t) decreased.

Test No. 25 is an example that used steel grade 22 in Table 1 with a small amount of B. In this example, the area ratio of ferrite increased, but the total area ratio of tempered martensite and bainite decreased. As a result, the tensile strength (TS), 0.2% yield strength (YS), and stretch-flangeability (λ) decreased.

Tests No. 26 to No. 46 in Table 5 are examples that used steel grades 1 to 7 and 9 to 14 in Table 1, which had the compositions in accordance with the present invention, and were manufactured under the heat treatment conditions of Tests No. 26 to No. 46 in Table 3. Among them, Tests No. 26 to No. 31 in Table 5 used steel grade 1 in Table 1, which had the composition in accordance with the present invention, and were manufactured under the heat treatment conditions of Tests No. 26 to No. 31 in Table 3.

Test No. 26 is an example that used steel grade 1 in Table 1, which had the composition in accordance with the present invention. In this example, the T2 (° C.) was low and the area ratio of retained austenite (γ) increased. As a result, the tensile strength (TS), 0.2% yield strength (YS), and stretch-flangeability (λ) decreased.

Test No. 27 is an example that used steel grade 1 in Table 1, which had the composition in accordance with the present invention. In this example, the T2 (° C.) was high. Therefore, the area ratio of bainite decreased. As a result, the ductility (El) and stretch-flangeability (λ) decreased.

Test No. 28 is an example that used steel grade 1 in Table 1, which had the composition in accordance with the present invention. In this example, since the t2 (s) was short, the area ratio of bainite decreased. As a result, the ductility (El) decreased. In Test No. 28, because the area ratio of tempered martensite was larger than in Test No. 27, the stretch-flangeability (λ) did not decrease.

Test No. 29 is an example that used steel grade 1 in Table 1, which had the composition in accordance with the present invention. In this example, since the t2 (s) was long, the area ratio of tempered martensite decreased and the area ratio of bainite increased. As a result, the tensile strength (TS) and 0.2% yield strength (YS) decreased.

Test No. 30 is an example that used steel grade 1 in Table 1, which had the composition in accordance with the present invention. In Test No. 30, the T1 (° C.) was low, no bainite was formed, and the area ratio of ferrite increased, but the total area ratio of tempered martensite and bainite decreased. As a result, the tensile strength (TS), 0.2% yield strength (YS), and stretch-flangeability (λ) decreased.

Test No. 31 is an example that used steel grade 5 in Table 1, which had the composition in accordance with the present invention. In this example, the T1 (° C.) was high, no bainite was formed, and only tempered martensite was formed. For this reason, the tensile strength (TS) and 0.2% yield strength (YS) greatly increased. As a result, the ductility (El) and stretch-flangeability (λ) decreased.

Tests No. 32 to No. 35 are examples that used steel grades 1 to 4 in Table 1, which had the compositions in accordance with the present invention, and were manufactured under the heat treatment conditions of Tests No. 32 to No. 35 in Table 3. In Tests No. 32 to No. 35, the T1 (° C.) was low. As a result, the area ratio of bainite increased, but since the area ratio of tempered martensite decreased, the 0.2% yield strength (YS) decreased and stretch-flangeability (λ) decreased.

Tests No. 36 to No. 43 are examples that used steel grades 6, 7, and 9 to 14 in Table 1, which had the compositions in accordance with the present invention, and were manufactured under the heat treatment conditions of Tests No. 36 to No. 43 in Table 3. In Tests No. 36 to No. 43, the T1 (° C.) was low. For this reason, the area ratio of bainite increased and the area ratio of tempered martensite decreased. As a result, the 0.2% yield strength (YS) decreased.

Tests No. 44 to No. 46 are examples that used steel grade 1 in Table 1, which had the compositions in accordance with the present invention, and were manufactured under the heat treatment conditions of Tests No. 44 to No. 46 in Table 3. In Tests No. 44 to No. 46, the T1 (° C.) was low. For this reason, the area ratio of tempered martensite decreased. As a result, the 0.2% yield strength (YS) decreased. Further, in Test No. 44 and Test No. 45, the CT (° C.) was low. For this reason, the total area ratio of tempered martensite and bainite in the surface layer portion increased and the area ratio of ferrite decreased. As a result, the bending processability decreased. In Test No. 46, the T1 (° C.) was low. For this reason, the area ratio of bainite increased, but since the area ratio of tempered martensite decreased, the 0.2% yield strength (YS) decreased and stretch-flangeability (λ) decreased.

The invention claimed is:

1. A high-strength cold-rolled steel sheet with a tensile strength of 980 MPa or higher and a 0.2% yield strength of 700 MPa or higher,
the high-strength cold-rolled steel sheet comprising: in percent by mass,
C: 0.07% to 0.15%,
Si: 1.1% to 1.6%,
Mn: 2.0% to 2.8%,
P: more than 0% to 0.015%,
S: more than 0% to 0.005%,
Al: 0.015% to 0.06%,
Ti: 0.010% to 0.03%, and
B: 0.0010% to 0.004%,
with the balance being iron and inevitable impurities,
wherein
an area ratio of following metal structures at a position of ¼ sheet thickness in the steel sheet satisfies following requirements:
tempered martensite: 30 area % or more,
bainite: 15 area % to 70 area %,
total of tempered martensite and bainite: 90 area % or more,
ferrite: 0 area % to 5 area %, and
retained austenite: 0 area % to 2 area %,
an area ratio of following metal structures in a surface layer region at 20 μm in a sheet thickness direction from an outermost surface layer portion of the steel sheet satisfies following requirements:
ferrite: 80 area % or more, and
a total area ratio of martensite and bainite: 0 area % to 20 area %.

2. The high-strength cold-rolled steel sheet according to claim 1, further comprising one or more selected from the group consisting of: in percent by mass,
Cu: more than 0% to 0.3%,
Ni: more than 0% to 0.3%,
Cr: more than 0% to 0.3%,
Mo: more than 0% to 0.3%,
V: more than 0% to 0.3%, and
Nb: more than 0% to 0.03%.

3. The high-strength cold-rolled steel sheet according to claim 1, further comprising, in percent by mass, Ca: more than 0% to 0.005%.

4. The high-strength cold-rolled steel sheet according to claim 2, further comprising, in percent by mass, Ca: more than 0% to 0.005%.

5. A high-strength hot-dip galvanized steel sheet having a galvanized layer on a surface of the high-strength cold-rolled steel sheet according to claim 1.

6. A high-strength hot-dip galvannealed steel sheet having a galvannealed layer on a surface of the high-strength cold-rolled steel sheet according to claim 1.

* * * * *